United States Patent [19]

Cantore

[11] 3,995,659
[45] Dec. 7, 1976

[54] QUICK-COUPLING VALVED JOINT FOR PIPES EMBODYING VALVED MALE AND FEMALE COUPLING ELEMENTS

[75] Inventor: Bruno Cantore, Caselette (Turin), Italy

[73] Assignee: Pres Block S.p.A., Caselette (Turin), Italy

[22] Filed: June 23, 1975

[21] Appl. No.: 589,187

[30] Foreign Application Priority Data

June 28, 1974 Italy .................. 12867/74

[52] U.S. Cl. .................. 137/614.03; 251/149.6
[51] Int. Cl.² .................. F16L 29/00; F16L 37/28
[58] Field of Search .................. 137/614.04, 614.05, 137/614.06, 614.03; 251/149.6, 149.7, 337

[56] References Cited

UNITED STATES PATENTS

| | | | |
|---|---|---|---|
| 2,725,076 | 11/1955 | Hansen et al. .................. | 251/337 X |
| 2,761,469 | 9/1956 | Hansen .................. | 137/614.05 |
| 2,934,085 | 4/1960 | Mylander .................. | 137/543.19 |
| 3,336,944 | 8/1967 | Anderson et al. .................. | 137/614.04 |
| 3,367,366 | 2/1968 | Oliveau et al. .................. | 137/614.06 X |
| 3,567,175 | 3/1971 | Scivto, Jr. .................. | 251/149.6 |
| 3,586,047 | 6/1971 | Ehrenberg .................. | 137/614.04 |
| 3,687,161 | 8/1972 | Grguric et al. .................. | 137/614.05 X |

*Primary Examiner*—William R. Cline
*Attorney, Agent, or Firm*—Larson, Taylor and Hinds

[57] ABSTRACT

A quick-coupling joint for pipes comprises a female coupling element and a male coupling element, both of the elements being provided with spring-loaded shut-off valves for automatically terminating the flow of fluid through said coupling elements whenever they are disconnected, the valves being automatically shifted to their open positions when the coupling elements are connected. The spring for the valve of the male coupling element is a helical coil spring having axially spaced coil sections of two different diameters, such that the larger diameter section expands outwardly and firmly embraces axial ribs formed in the flow passage of the male element so as to anchor the spring, and the lesser diameter section biases and moves with the valve element. The male element valve is guided axially by the axial ribs, which form flow passages about the valve when in the open position.

1 Claim, 6 Drawing Figures

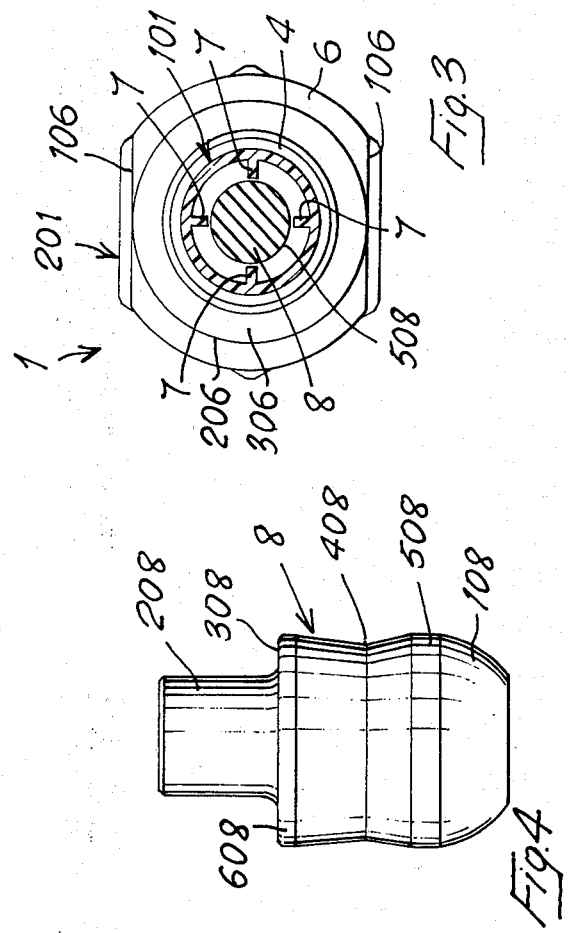
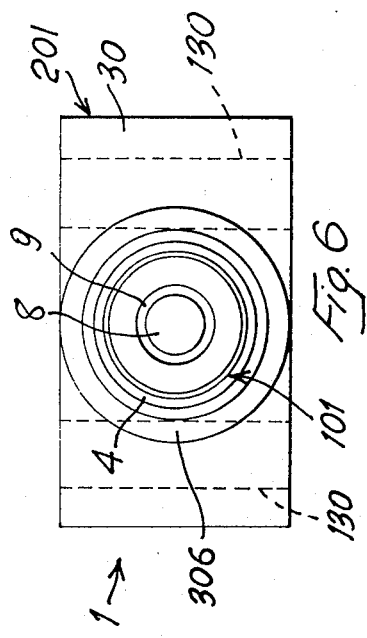
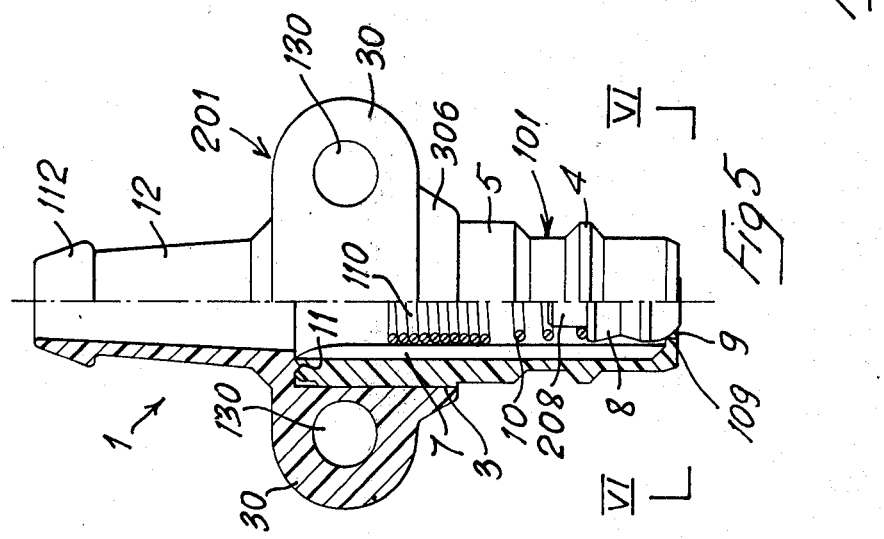

QUICK-COUPLING VALVED JOINT FOR PIPES EMBODYING VALVED MALE AND FEMALE COUPLING ELEMENTS

BACKGROUND AND SUMMARY OF THE INVENTION

This invention relates to a quick-coupling joint for pipes, of the kind comprising a female coupling element provided with a plug-in bore closed by a valve in the uncoupled condition of the joint, and a male coupling element which may be nested in the female coupling element in a disengageable manner.

For many uses, it is of the utmost importance to provide also the male element of the joint with valve means, in order to avoid any leakage of fluid from the joint during the uncoupling of the joint elements, as well any introduction of air or other substances in the pipes, during the coupling of the joint elements. Joints of this kind are for instance requested for connecting the fuel tank to the motor of a motor boat.

Joints provided with valve elements on both the male and female coupling element of the joint are known.

However, the prior art joints of this kind are very voluminous, costly, heavy and difficult to assemble.

Therefore the present invention aims to provide a quick coupling joint of the kind referred to, which avoids the disadvantages of the prior art joints.

BRIEF DESCRIPTION OF THE DRAWINGS

The above and other features of the present invention will be better evident from the following specification made with reference to the accompanying drawings, in which:

FIG. 3 is a transversal section taken along line III—III of FIG. 1.

FIG. 4 is a side view in enlarged scale of the valve member of the male joint element of FIG. 1.

FIG. 5 is a partially sectioned side view of a second embodiment of a male element of a joint according to the invention, and FIG. 6 is a front view from the plane of the lines VI—VI of the joint element of FIG. 5.

DESCRIPTION OF THE PREFERRED EMBODIMENT OF THE INVENTION

Figure 1:
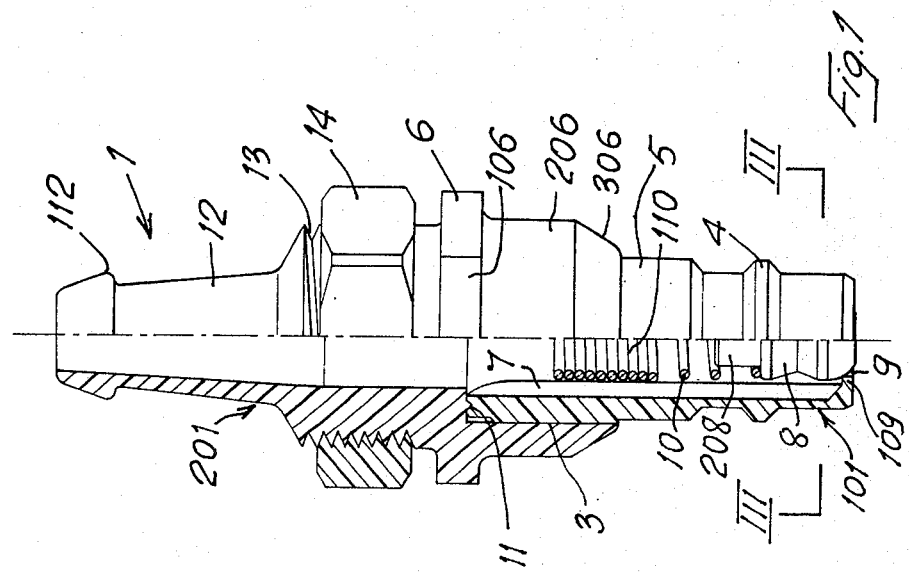
FIG. 1 is a partially sectioned side view of the male element of a joint according to the invention.
Figure 2:
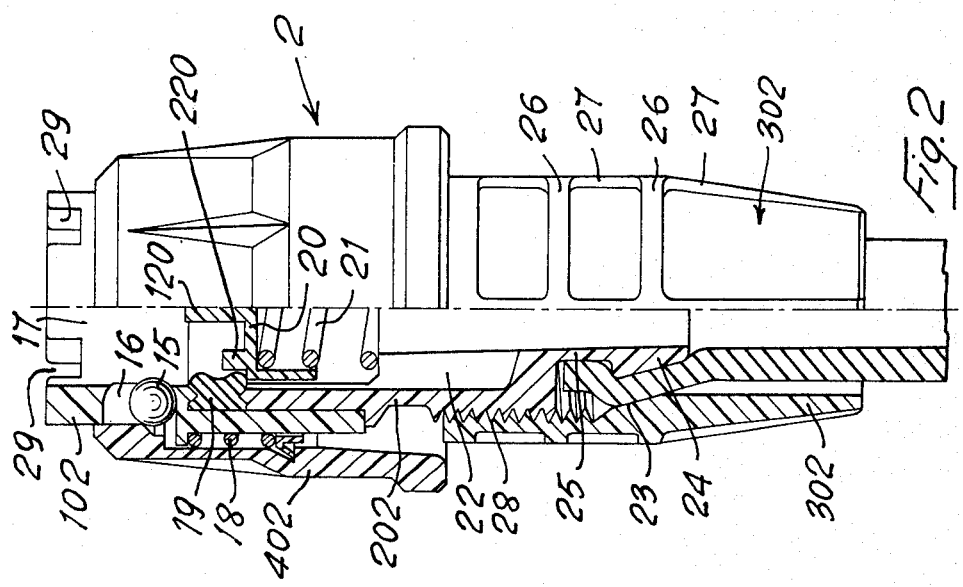
FIG. 2 is a partially sectioned side view of the female element of a joint according to the invention.

The quick-coupling joint for pipes comprises a male coupling element 1 and a female coupling element 2. The male coupling element is formed into two parts 101, 201. The part 201 is provided at one end with a tubular sleeve 206 provided with a tapered rim portion 306. At the end opposite to the rim 306, the said sleeve 206 is provided with an annular flange 6, having two flattened portions 106. To the said flange 6 a threaded sleeve 13 is connected, on which the nut 14 is screwed. To the said sleeve 13, a stub 12 is connected, provided at its free end with an enlarged head 112, for connection to a suitable hose (not shown).

The part 101 is provided at one end with a tubular portion 3, which is inserted into the tubular sleeve 206 of the part 201, until abutment against an annular shoulder provided with an annular sealing rib 11, which nests into a corresponding sealing groove formed in the front end of the tubular portion 3. The said tubular portion 3 is maintained into firm engagement with the sleeve 206 by means for instance of a suitable cement.

To the tubular portion 3 the cylindrical shaft portion 5 of the male coupling element is connected, which is in turn provided with an intermediate annular rim 4, disposed between two portions of reduced diameter of the said shaft portion 5.

The male element is provided with an axial through bore provided in the region of the part 101 with a number of radially inwardly projecting axially aligned ribs 7. Between the said ribs 7 the valve head 8 is guided for axial movement to and from the valve seat 9. As best shown in FIG. 4, the said valve head comprises a cup-shaped front portion 108, an adjoining cylindrical portion 508, an intermediate body portion 408 of reduced diameter with respect to the portion 508, and a cylindrical end portion 608 of a diameter equal to the diameter of the portion 508. To the said end portion 608 the valve stem 208 is secured. The said stem 208 is fitted into the end winding of a conically wound spring 10, urging the valve head 8 against the valve seat 9 formed on the rim of the fore end 109 of the male coupling element 1. The spring 10 is provided with an anchoring section 110 formed by a number of adjacent cylindrical windings, which are inserted into the boring of the part 101 of the male element, tightly wound around a suitable tool, which is thereafter removed allowing the said windings to radially expand until abutment against the ribs 7, thus firmly locating the spring 110, 10 inside of the male coupling element.

The female coupling element 2 comprises two sleeve members 102 and 202 connected one to another. The sleeve member 202 is provided with a hose clamping sleeve 302 and with a stub 25 for connection to the corresponding end of a pipe. The clamping sleeve 302 is screwed in 28 to the sleeve member 202 and is provided with an inner abutment surface 23, cooperating with the head 24 of the stub 25 to clamp the hose inserted on the stub 25. The sleeve 302 is provided on its outer surface with crossing ribs 26, 27. The sleeve member 102 is provided at its head end with notches 29. Between the two sleeve members 102 and 202 a sealing ring 19 is clamped. The said sealing ring 19 projects inwardly into the through bore of the female coupling element 2. In the sleeve element 102 a plug-in bore 17 is formed for the insertion of the male coupling element 1. The said bore 17 extends down to the annular sealing ring 19 and is of a diameter such as to receive the shaft 5 and the rim 4 of the male element 1.

On the sleeve member 102 an external actuating sleeve 402 is mounted. A helical spring 18 constantly urges the sleeve 402 downwardly. In the end section of the sleeve member 102 at least three radial openings 16 are formed. The said openings are in the same horizontal plane, and are angularly offset one from another. In each of the said openings, a detent ball 15 is housed, the said balls being shiftable in radial directions.

In the axial through bore of the sleeve member 202 the valve disk 20 is axially shiftably mounted. The said valve disk 20 is provided on its upper side directed toward the through bore 17 of the sleeve member 102 with a number of projecting abutment pins 220, which are disposed on a diameter corresponding to the diameter of the fore end of the male coupling element 1, and with an upwardly projecting central pin 120 which is longer than the pins 220.

Between the valve disk 20 and an internal stepped abutment formed in the sleeve member 202 a helical spring 21 is inserted, constantly urging the valve disk axially upwardly toward the bore 17 of sleeve element 102, into abutment with the annular sealing ring 19.

OPERATION OF THE DESCRIBED DEVICE

The operation of the described quick-coupling joint will be evident. By nesting the male coupling element 1 into the female coupling element 2, the valve 8 is shifted axially clear from its seat 109 by the pin 120. At the same time, the valve 20 is shifted axially clear from the sealing ring 19 by the male element. In this manner, the communication between male and female element is open.

DESCRIPTION OF THE SECOND EMBODIMENT OF THE INVENTION

In FIG. 5 a second embodiment of the invention is shown.

According to this embodiment, the male coupling element is provided, instead of the flange 6, with a plate like member 30, provided with two side bores 130 at right angles with respect to the joint axis, which may be utilized for assembling the said male element on suitable pins (not shown).

Having thus fully described my invention, I claim:

1. A quick-coupling joint for pipes, comprising a female coupling member having a plug-in bore, a sealing ring mounted in said bore and forming a first valve seat, a first valve member movably supported in said bore for seating on and unseating from said valve seat, a first spring constantly urging said first valve member into closed position on said first valve seat, and a male coupling member having a shaft section for nesting into the plug-in bore of said female coupling member, said shaft section of the male member having an axial flow passage, a second valve member housed in said passage, a second valve seat formed at the free end of the said shaft section at the terminus of said flow passage, a second spring in said passage urging said second valve member into closed position on said second valve seat, means for automatically shifting said valve members in respective opening directions against the action of said springs whenever the said male coupling member is nested in the plug-in bore of said female coupling member and for releasing said valve members on disconnecting the said coupling members so that said valve members are automatically urged by said springs into their respective closure positions, the flow passage of said male coupling member having at least three inwardly projecting axially extending ribs defining at least three flow paths between the ribs and a central portion along which said second valve member is slidably guided, said second spring comprising two axially adjacent sections, the first section being an anchoring section comprising a number of adjacent windings of normal diameter greater than the diameter of the central portion defined by said axial ribs such that said windings of said anchoring section bear radially outwardly and forcefully against the inner edges of said ribs in the flow passage of said male coupling member, the second section of said second spring comprising a valve actuating section comprising a number of windings having each a normal diameter less than the inner diameter of said central portion and less than the inner diameter of said central portion and less than the diameter of said anchoring section so as to be freely movable in said flow passage to move with and bias said second valve member, said second valve member having a valve head formed with an arcuate cup-shaped portion cooperating with said second valve seat and terminating in a flat end surface which in the closed condition of said second valve member is flush with the external end surface of said second valve seat formed at the free end of the shaft of said male coupling member.

* * * * *